United States Patent
Kottilingal

(10) Patent No.: US 8,542,668 B2
(45) Date of Patent: Sep. 24, 2013

(54) WIRELESS VOIP/VIP ROAMING TO ACCESS POINT OF DIFFERENT NETWORK TYPE

(75) Inventor: Sudeep Ravi Kottilingal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1874 days.

(21) Appl. No.: 11/211,237

(22) Filed: Aug. 24, 2005

(65) Prior Publication Data

US 2007/0047516 A1 Mar. 1, 2007

(51) Int. Cl.
- H04L 12/66 (2006.01)
- H04W 4/00 (2009.01)
- H04W 36/00 (2009.01)

(52) U.S. Cl.
USPC ............................ 370/352; 370/331; 455/436

(58) Field of Classification Search
USPC ................ 709/230; 370/331, 392, 352, 338; 455/439, 436
See application file for complete search history.

(56) References Cited

U.S. PATENT DOCUMENTS

| | | | |
|---|---|---|---|
| 7,539,175 B2 | 5/2009 | White et al. | |
| 7,647,374 B2 | 1/2010 | Rajahalme et al. | |
| 2002/0167921 A1 | 11/2002 | Vakil | |
| 2004/0030791 A1* | 2/2004 | Dorenbosch et al. | 709/230 |
| 2004/0072593 A1 | 4/2004 | Robbins et al. | |
| 2004/0095938 A1* | 5/2004 | Ryu | 370/392 |
| 2004/0207724 A1* | 10/2004 | Crouch et al. | 348/14.09 |
| 2004/0264410 A1* | 12/2004 | Sagi et al. | 370/331 |
| 2005/0070288 A1* | 3/2005 | Belkin et al. | 455/439 |
| 2007/0064684 A1 | 3/2007 | Kottilingal | |
| 2010/0040050 A1 | 2/2010 | Johnston | |

FOREIGN PATENT DOCUMENTS

| | | |
|---|---|---|
| EP | 1443784 A1 | 8/2004 |
| JP | 2000278423 A | 10/2000 |
| JP | 2003319461 | 11/2003 |
| JP | 2004015538 A | 1/2004 |
| JP | 2005064877 | 3/2005 |
| JP | 2005123993 | 5/2005 |
| JP | 2006501702 A | 1/2006 |
| JP | 2007507161 A | 3/2007 |

(Continued)

OTHER PUBLICATIONS

R.Mahy et al., The Session Interent Protocol (SIP) "Join" Header draft-ietf-sip-join-03.txt, Feb. 2004, IETF, pp. 1-12.*

(Continued)

*Primary Examiner* — Duc Nguyen
*Assistant Examiner* — Sonia Gay
(74) *Attorney, Agent, or Firm* — Kristine U. Ekwueme

(57) ABSTRACT

A mobile communication device (for example, a cellular telephone) has one air interface for wireless communication with wireless LAN and another air interface for cellular telephone communication with a cellular telephone network. Initially, the communication device is used to transmit VoIP packets of a media stream to a target communication device in a first session across one of the air interfaces. It is then desired to use the other air interface. A spawn SIP message is communicated to the target, which returns a spawn identifier. The communication device sets up a second session by sending a SIP INVITE containing the spawn identifier to the target across the other air interface. Both sessions are active VoIP sessions. The target uses the spawn identifier to associate the first and second sessions. The flow of VoIP packets for the media stream is then switched from the first session to the second session.

25 Claims, 10 Drawing Sheets

(56) References Cited

FOREIGN PATENT DOCUMENTS

| WO | WO03105442 | 12/2003 |
| WO | 2004013998 A2 | 2/2004 |
| WO | 2005006570 A2 | 1/2005 |
| WO | WO2006010614 | 2/2006 |

OTHER PUBLICATIONS

Hersent et al. IP Telephony Packet-based multimedia communications System, pp. 122-1145, 151, 152, copyright 2000.

International Search Report and Written Opinion—PCT/US2006/033267, International Search Authority—European Patent Office—May 2, 2007.

ROC Taiwanese Search report—095131149—TIPO—Jun. 21, 2009.

Rudkin S. et al., "Real-Time Applications on the Internet," BT Technology Journal, vol. 15, No. 2, (Apr. 1997), 209-225.

Mahy et al, "The Session Initiation Protocol (SIP) Replaces Header", Sep. 2004, RFC 3891, pp. 1-16.

\* cited by examiner

INVITE FOR FIRST SESSION

INVITE SIP:BOB@BILOXI.COM SIP/2.0
    VIA: SIP/2.0/UDP PC33.ATLANTA1.COM;BRANCH=Z9HG4BK776ASDHDS
    MAX-FORWARDS: 70
    TO: BOB <SIP:BOB@BILOXI.COM>
    FROM: ALICE <SIP:ALICE@ATLANTA1.COM>;TAG=1928301774
    CALL-ID: A84B4C76E66710@PC33.ALTANTA1.COM
    CSEQ: 314159 INVITE
    CONTACT: SIP:ALICE@PC33.ATLANTA1.COM.
    CONTENT-TYPE: APPLICATION/SDP
    CONTENT-LENGTH: 142

INVITE FOR FIRST SESSION

INITIALIZE FIRST SESSION

FIRST SESSION ACTIVE -
PARTY A MOVES AWAY FROM LAN ACCESS POINT

```
SPAWN SIP:BOB@BILOXI.COM SIP/2.0
   VIA: SIP/2.0/UDP PC33.ATLANTA2.COM;BRANCH=ADFS
   MAX-FORWARDS: 70
   TO: BOB <SIP:BOB@BILOXI.COM>
   FROM: ALICE <SIP:ALICE@ATLANTA2.COM>;TAG=876767776
   CALL-ID: D7878-0-A2@PC33.ALTANTA2.COM
   CSEQ: 314160 SPAWN
   CONTACT: SIP:ALICE@PC33.ATLANTA2.COM.
   CONTENT-TYPE: APPLICATION/SDP
   CONTENT-LENGTH: 142

MASTER VIA: PC33.ATLANTA1.COM;BRANCH=Z9HG4BK776ASDHDS
   MASTER TO: BOB <SIP:BOB@BILOXI.COM>
   MASTER FROM: ALICE <SIP:ALICE@ATLANTA1.COM>;TAG=1928301774      SO CALLEE CAN
   MASTER CALL-ID: A84B4C76E66710@PC33.ATLANTA1.COM                IDENTIFY WITH
                                                                   FIRST SESSION
   MASTER CSEQ: 314159 INVITE
   MASTER CONTACT: <SIP:ALICE@PC33.ATLANTA.COM>
```

SPAWN MESSAGE

FIG. 7

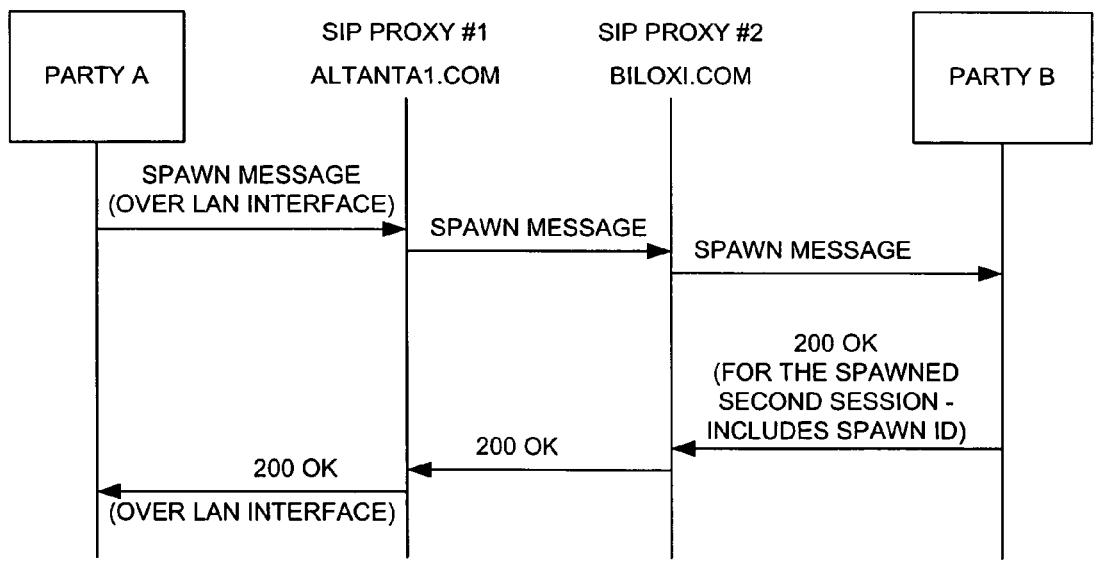

SPAWN MESSAGE

FIG. 8

SPAWN MESSAGE

INVITE FOR SECOND SESSION

BOTH FIRST SESSION AND SECOND SESSION
ARE ACTIVE

MEDIA FLOW HANDOFF

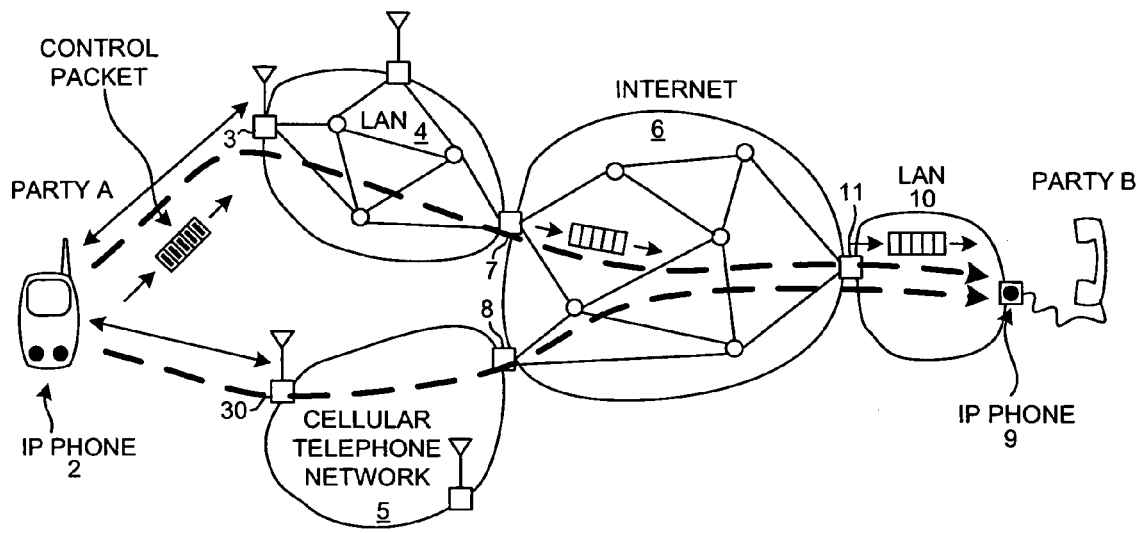

MEDIA FLOW HANDOFF CONTROL PACKET

FIG. 13

SWITCH SIP:BOB@BILOXI.COM SIP/2.0

VIA: SIP/2.0/UDP PC33.ATLANTA2.COM;BRANCH=ADFDSGFSS

MAX-FORWARDS: 70

TO: BOB <SIP:BOB@BILOXI.COM>

FROM: ALICE <SIP:ALICE@ATLANTA2.COM>;TAG=876198

CALL-ID: D7878-0-A2@PC33.ALTANTA2.COM

CSEQ: 31401 SWITCH

CONTACT: SIP:ALICE@PC33.ATLANTA2.COM.

CONTENT-TYPE: APPLICATION/SDP

CONTENT-LENGTH: 142

SPAWN-ID: ASD14KLJLDK1567E409870

SWITCH-FROM: ALICE <SIP:ALICE@ATLANTA1.COM>
    SPAWN-TO: ALICE <SIP:ALICE@ATLANTA2.COM>

MEDIA FLOW HANDOFF CONTROL PACKET

FIG. 14

MEDIA FLOW OVER SECOND SESSION

BYE PACKET SENT ON FIRST SESSION

FIRST SESSION TERMINATED BUT
SECOND SESSION REMAINS

ALTERNATIVE HANDOFF MECHANISM

WIRELESS VOIP/VIP ROAMING TO ACCESS POINT OF DIFFERENT NETWORK TYPE

CROSS-REFERENCE TO OTHER APPLICATIONS

This application is related to U.S. patent application Ser. No. 11/211,249 entitled, "INTERLEAVING VoIP/VIP TRANSMISSIONS IN MULTIPLE SESSIONS TO INCREASE QUALITY OF SERVICE IN MOBILE DEVICES HAVING MULTIPLE INTERFACES", filed on Aug. 24, 2005.

BACKGROUND

1. Field

The disclosed embodiments relate generally to IP telephony.

2. Background

Mobile communication devices such as cellular telephones may have more than one air interface. In one example, a cellular telephone is able to communicate conventionally over relatively long distances with a cellular telephone network using a CDMA (Code Division Multiple Access) transceiver. The CDMA transceiver of the cellular telephone communicates with a cellular BTS (Base Transmitter Site) on the cellular telephone network. In addition, the cellular telephone is able to communicate over relatively short distances with a wireless local area network (LAN) using an IEEE 802.11 transceiver. The 802.11 transceiver of the cellular telephone communicates wirelessly with an access point on the LAN.

A first party may use the cellular telephone to place call to a second party using VoIP (voice over Internet Protocol) technology. Voice data is communicated in IP packets from the cellular telephone, over the 802.11 wireless link to the access point, through the LAN, and across the Internet to the second party. When the first party is engaged in such a call, the first party may wish to move away from the 802.11 access point so that the 802.11 communication link is broken. In such a situation, it is desired that the call not be dropped but rather that the call be automatically switched to use longer range cellular telephone network so that the call can be continued using the cellular telephone network.

U.S. Patent Application Publication 2004/0264410 to Sagi et al. discloses using SIP (Session Initialization Protocol) to set up a first VoIP (Voice over Internet Protocol) call between a first communication device and a second communication device. A SIP INVITE message passes from the first communication device, across a wireless link between the first communication device and a wireless access point on a wireless LAN, through an enterprise server, and to a second communication device. When the first communication device begins to move outside the coverage area of the wireless LAN, the enterprise server places a new call to a private number associated with the first communication device on a cellular WAN (Wide Area Network). The new call involves a conventional circuit-switched link between the first communication device and a BTS (cellular Base Transmitter Site) of the cellular WAN. Once the new call is set up using a convention call setup procedure, the enterprise server establishes a three-way conference call involving the first call and the new call. The enterprise server then terminates the link over the wireless LAN. The result is a call that includes a circuit-switched link from the first communication device to the cellular BTS. The resulting call is undesirable in some respects because using the circuit-switched link involves reserving a dedicated amount of bandwidth even if the call that is the subject of the handoff requires a fluctuating amount of bandwidth or only requires a small amount of bandwidth. Where the reservation of an excess amount of unused bandwidth involves added cost, the cost of the handed off call is made undesirably high.

Not only can the cost of the handed off call be undesirably high, but the special enterprise server is required. Providing and maintaining such an enterprise server can be costly. Moreover, the handoff method cannot be practiced in regimes where no such enterprise server has been deployed. Even if an enterprise server is provided, it is required that the two calls both pass through the enterprise server. It is possible that the user of the first communication device may roam into a coverage area of a cellular network where the second call would not pass through the enterprise server. The call handoff method cannot therefore be practiced. A solution is desired.

SUMMARY INFORMATION

A mobile communication device (for example, a cellular telephone) has one air interface for wireless communication with a wireless LAN (Local Area Network) and another air interface for cellular telephone communication with a cellular telephone network. Wireless communication with the wireless LAN may, for example, be in accordance with IEEE 802.11. The cellular telephone network may, for example, be a CDMA (Code Division Multiple Access) telephone network.

Initially, the mobile communication device is used to transmit data payload VoIP packets of a media stream to a target communication device (for example, to another IP telephone that is coupled to the Internet at a remote location) in a first session across one of the air interfaces. The VoIP packets are communicated using RTP (Real-Time Protocol) over UDP (User Datagram Protocol) over (IP Internet Protocol). The VoIP media stream may, for example, involve voice data for a conversation between a first PARTY A using the mobile communication device and a second PARTY B using the target communication device.

It is then desired to continue the call using the other air interface of the mobile communication device. This may, for example, be due to the air interface initially being used being a short range wireless LAN interface. PARTY A may move out of the coverage area of the short range wireless LAN. It is desired to continue the call by switching to using the longer range cellular telephone air interface. Alternatively, it may be desired to switch from using the first air interface to the second air interface where the first interface is a longer range cellular telephone interface and the second air interface is a shorter range wireless LAN interface. Initially the cellular telephone air interface is used, but then PARTY A moves into the coverage area of the wireless LAN. If, for example, PARTY A's cellular telephone provider charges to carry a voice conversation on its cellular telephone network, then it may be desirable for PARTY A to stop using the cellular air interface and to continue the call using the less expensive wireless LAN air interface.

Regardless of the reason for desiring to switch from the initially used air interface to the other air interface, PARTY A's mobile communication device sends a SPAWN SIP message to PARTY B's target communication device. The SPAWN SIP message is communicated using SIP (Session Initialization Protocol) over TCP (Transmission Control Protocol) over IP. The target responds by sending a 200 OK SIP message that contains a spawn identifier. The mobile communication device then sets up a second session across the other air interface by sending a SIP INVITE request across the other interface to the target. The SIP INVITE request contains the spawn identifier. The second session is initialized and both the first and second sessions are active VoIP sessions. Neither session involves a circuit-switched link. The target communication device uses the spawn identifier received in the SIP INVITE request to associate the first and second sessions.

Once the second session is initialized, the mobile communication device stops transmitting VoIP packets for the media stream in the first session and transmits subsequent VoIP packets for the media stream in the second session. In some embodiments, a handoff control packet is sent from the mobile communication device to the target to alert the target that subsequent VoIP packets will no longer be received in the first session but rather will be received in the second session. In other embodiments, the target determines that the second session is now being used to communicate data payload VoIP packets because data payload VoIP packets for the media stream are no longer being received by the target in the first session but rather data payload VoIP packets for the media stream are now being received by the target in the second session. Regardless of how the target determines that VoIP packets are now being communicated in the second session, the flow of VoIP packets in both directions between PARTY A's communication device and PARTY B's communication device now occurs in the second session and not the first session.

Where, for example, the data payload VoIP packets contain voice data for a conversation, the communication device that receives the VoIP packets buffers VoIP payloads received in the second session in a FIFO (first in first out) buffer behind the payloads of the VoIP packets received in the first session. The VoIP packets are ordered in the FIFO according to the RTP sequence number and timestamps. The output of the FIFO buffer is converted into sound that is heard by the user of the communication device.

As long as the two sessions remain active, the flow of data payload VoIP packets can be switched from one session to the other and back as desired. A session not being used to communication data payload VoIP packets can be terminated if desired. To terminate the first session, the mobile communication device sends a SIP BYE message to the target communication device in accordance with the SIP protocol.

Additional embodiments are described in the detailed description below. This summary does not purport to define the invention. The invention is defined by the claims.

BRIEF DESCRIPTION OF THE DRAWINGS

FIG. 7 is a diagram of a SPAWN SIP message sent from IP phone 2 to IP phone 9 in accordance with the novel method.

FIG. 8 is a diagram that illustrates the communication of the SPAWN SIP message in the novel method.

FIG. 9 also illustrates the returning 200 OK SIP message that includes a SPAWN ID.

FIG. 13 illustrates the sending of the handoff control packet from IP phone 2 to IP phone 9.

FIG. 14 is a diagram of the handoff control packet.

DETAILED DESCRIPTION

Figure 1:
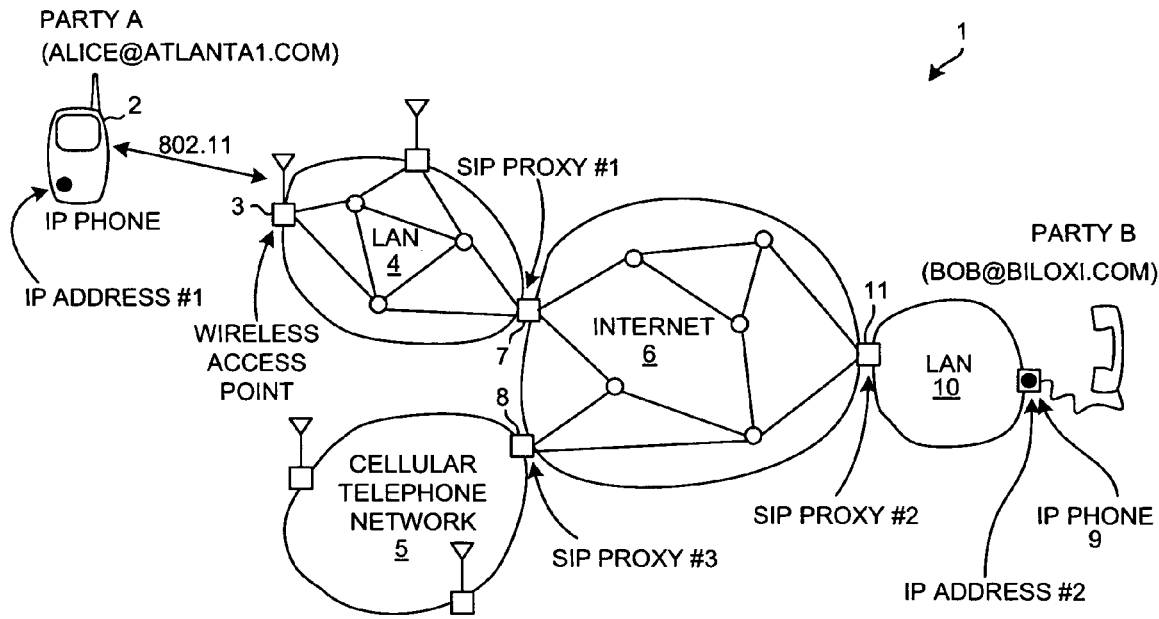
FIG. 1 is a simplified topological diagram of an IP (Internet Protocol) telephony communication system 1 in accordance with one novel aspect.

FIG. 1 is a simplified topological diagram of an IP (Internet Protocol) telephony communication system 1 in accordance with one novel aspect. A first party (denoted "PARTY A" in FIG. 1) uses a mobile wireless communication device such as an IP phone 2. IP phone 2 has an IP address denoted IP address #1 in FIG. 1. IP phone 2 is capable of short range wireless communication with an access point 3 on a LAN (Local Area Network) 4 provided that IP phone 2 is within communication range of access point 3. IP phone 2 and access point 3 communicate in this example in accordance with the IEEE 802.11 specification. LAN 4 includes multiple such access points so that PARTY A can move the IP phone 2 around in a local region and remain in communication with LAN 4 via at least one of the access points.

System 1 also includes a cellular telephone network 5. Cellular telephone network 5 in this example is a CDMA (Code Division Multiple Access) cellular telephone network. IP phone 2 is also capable of long range wireless communication with a transceiver on CDMA cellular telephone network 5. Party A can use IP phone 2 to place and receive calls via CDMA cellular telephone network 5. Because IP phone 2 is capable of 802.11 communication as well as CDMA cellular telephone communication, IP phone 2 is termed a dual-mode IP phone.

LAN 4 and cellular telephone network 5 are coupled to an IP network. The IP network in this example is an internet or the "Internet" 6. Internet 6 includes a plurality of interconnected routers. A SIP proxy 7 is disposed both on LAN 4 and on the Internet 6 such that this SIP proxy 7 can communicate IP packets from LAN 4 and to Internet 6 and from Internet 6 and to LAN 4. SIP proxy 7 acts both as an inbound proxy and an outbound proxy for the ATLANTA1.com domain of LAN 4. SIP proxy 7 acts as a server on LAN 4 and as a client on Internet 6. SIP proxy 7 relays SIP requests and SIP responses from/to other SIP proxies and SIP session end points.

Another SIP proxy 8 is disposed both on cellular telephone network 5 and on Internet 6 such that this SIP proxy 8 can communicate IP packets from cellular telephone network 5 and to Internet 6 and from Internet 6 and to cellular telephone network 5. SIP proxy 8 acts both as an inbound proxy and an outbound proxy for the ATLANTA2.com domain of cellular telephone network 5. SIP proxy 8 acts as a server on cellular telephone network 5 and as a client on Internet 6. SIP proxy 8 relays SIP requests and SIP responses from/to other SIP proxies and SIP session end points.

A second party (denoted "PARTY B" in FIG. 1) has a second communication device such as an IP phone 9. IP phone 9 in this example is not a mobile IP telephone, but rather is a stationary landline IP telephone. IP phone 9 has an IP address denoted IP address #2 in FIG. 1. IP phone 9 is coupled to the Internet 6 via a LAN 10. LAN 10 may, for example, be a LAN maintained by PARTY B's Internet Service Provider (ISP) or may be a corporate LAN maintained by PARTY B's employer. A SIP proxy 11 is disposed both on LAN 10 and on the Internet 6 such that this SIP proxy 11 can communicate IP packets from LAN 10 and to Internet 6 and from Internet 6 and to LAN 10. SIP proxy 11 acts both as an inbound proxy and an outbound proxy for the BILOXI.com domain of LAN 10. SIP proxy 11 acts as a server on LAN 10 and as a client on Internet 6. SIP proxy 11 relays SIP requests and SIP responses from/to other SIP proxies and SIP session end points.

Figure 2:
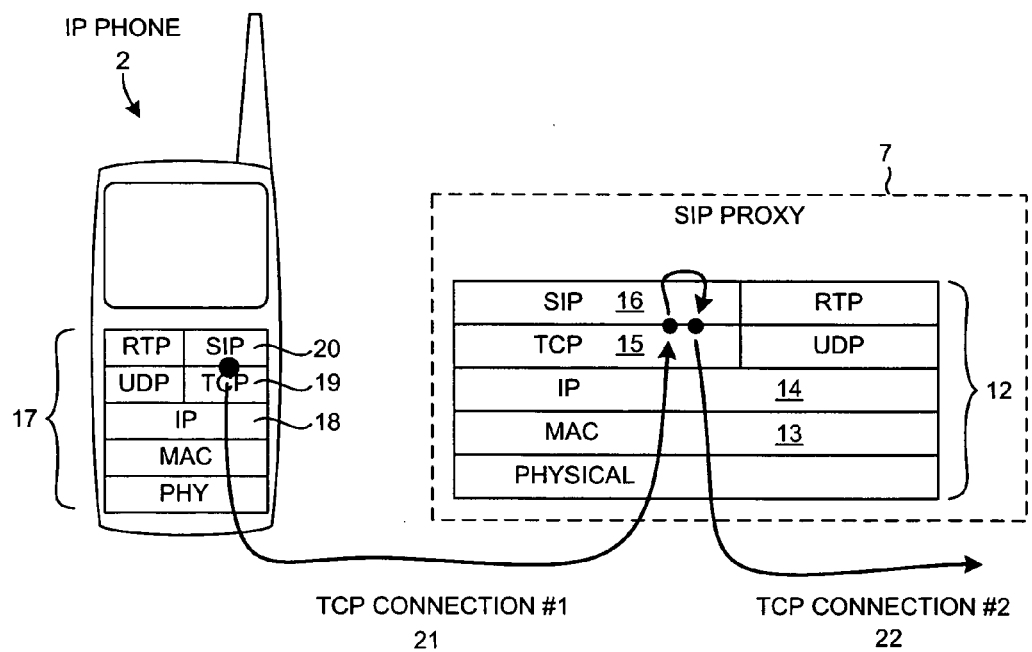
FIG. 2 illustrates a TCP connection between IP phone 2 and SIP proxy 7 in the system of FIG. 1.

FIG. 2 illustrates IP phone 2 and SIP proxy 7. A stack 12 of protocol processing layers executes on the hardware platform of SIP proxy 7. There is one such stack of protocol processing layers executing on each of the SIP proxies 7, 8 and 11. Stack 12 includes, among other layers, a MAC layer 13, an IP layer 14, a TCP layer 15, and a SIP layer 16. MAC stands for "Media Access Control". IP stands for "Internet Protocol". TCP stands for "Transmission Control Protocol". SIP stands for "Session Initialization Protocol". The processor within IP phone 2 executes a similar stack 17 of protocol processing layers. Stack 17 includes an IP layer 18, a TCP layer 19 and a SIP layer 20. Because each of the stacks 12 and 17 includes an IP layer and a TCP layer, a TCP connection can be established between the IP phone 2 and SIP proxy 7. In FIG. 2, the black dot in IP phone 2 represents IP address #1 of IP phone 2. The black dots in SIP proxy 7 represent IP addresses. The leftmost arrow represents a first TCP connection 21 that terminates in IP phone 2 and in SIP proxy 7. Whereas IP protocol communication is only a best-efforts communication, the use of TCP in addition to IP allows the reliable communication of information between IP phone 2 and SIP proxy 7 across the TCP connection 21. In the same way that TCP connection 21 is established and maintained between IP phone 2 and SIP proxy 7, a second TCP connection 22 is established and maintained between SIP proxy 7 and another device on the Internet that has an IP address and that has a stack involving IP and TCP protocol processing layers. SIP proxy 11 (see FIG. 1) is one such device. In FIG. 2, the rightmost arrow represents a second TCP connection 22 that is terminated on one end by SIP proxy 7 and on another end by SIP proxy 11.

Figures 3, 4:
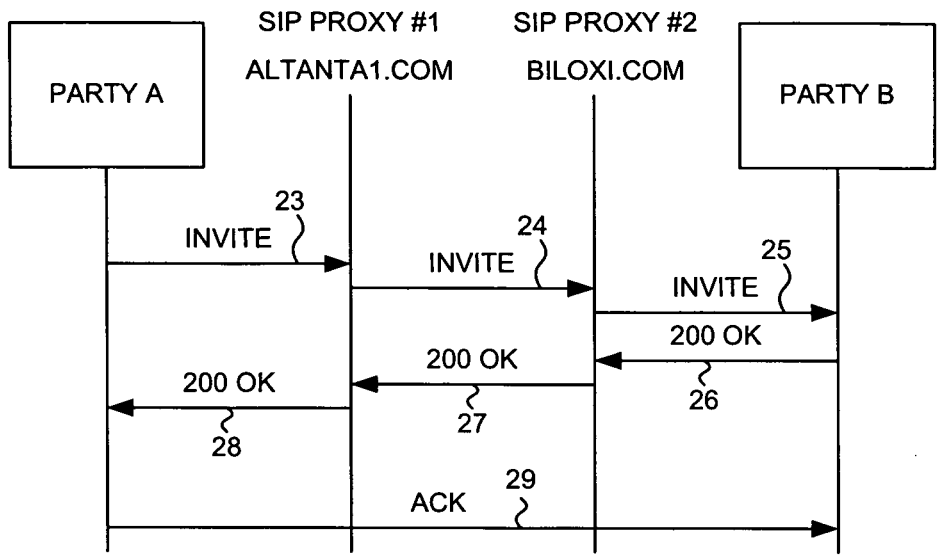
FIG. 3 is a diagram of a first step in accordance with a novel method.
FIG. 4 is a diagram of the SIP INVITE request for setting up a first session in accordance with the novel method.

FIG. 3 is a diagram of a first step in accordance with a novel method. In the diagram, time extends from top to bottom in the vertical dimension. The box labeled "PARTY A" and the vertical line extending downward from the box represents IP phone 2. The box labeled "PARTY B" and the vertical line extending downward from the box represents IP phone 9. The vertical line labeled "SIP PROXY #1" represents SIP proxy 7. The vertical line labeled "SIP PROXY #2" represents SIP proxy 11.

Within IP phone 2 is stored an identification of a SIP proxy to be used when IP phone 2 is in communication with LAN 4. IP phone 2 stores another identification of another SIP proxy to be used when IP phone 2 is in communication with cellular telephone network 5. In the present example, the identification of the SIP proxy to be used when communicating with LAN 4 is PROXY1.ATLANTA1.COM. The identification of the SIP proxy to be used when communicating with cellular telephone network 5 is PROXY3.ATLANTA2.COM. Because IP phone 2 is in communication with LAN 4, IP phone 2 uses the identification PROXY1.ATLANTA1.COM and resolves this identification to get the IP address of the LAN side of the identified SIP proxy. If the IP address of the LAN side of the identified SIP proxy is cached in IP phone 2 in association the SIP proxy having been addressed in a prior SIP transaction, then the cached IP address is used as the IP address of the LAN side of the SIP proxy. If the IP address of the LAN side of the identified SIP proxy is not cached in IP phone 2, then IP phone 2 sends a DNS request to a DNS server (not illustrated). The DNS server is, in this example, located on LAN 4. The DNS server contains a lookup table that contains, for each SIP proxy, an IP address. The DNS server responds to the DNS request by sending the IP address back to IP phone 2. In the present example, the IP address of IP phone 2 may be 10.32.1.141. Regardless of how IP phone 2 obtains the IP address of the LAN side of the identified SIP proxy, IP phone 2 acts as a SIP caller or call initiator and sends the SIP INVITE request to the IP address of the LAN side of the SIP proxy out over TCP connection 21 between IP phone 2 and SIP proxy 7. In FIG. 3, the uppermost arrow 23 extending from PARTY A to ATLANTA1.COM represents the sending of this SIP INVITE request.

FIG. 4 is a diagram of the SIP INVITE request. A header field portion of the SIP INVITE request indicates that the SIP INVITE request is directed to the SIP address BOB@BILOXI.COM. A header field portion of the SIP INVITE request indicates that the SIP INVITE is "FROM" SIP address ALICE@ATLANTA1.COM. The SIP INVITE request is received at the terminated TCP connection on SIP proxy 7 and is supplied up to the SIP protocol processing layer of SIP proxy 7. The SIP protocol processing layer of SIP proxy 7 examines the addressee information and obtains BOB@BILOXI.COM. The SIP protocol processing layer then uses a set of policies to determine where to send the SIP INVITE request. The set of policies indicates, for each domain name, an associated SIP proxy. In the present example, a policy indicates that domain name BILOXI.COM is to be served by associated SIP proxy #2. The SIP protocol processing layer within SIP proxy 7 then resolves the identified SIP proxy #2 to determine the Internet side IP address of SIP proxy #2. This may be done by consulting cached information or by performing a DNS server lookup. Once the Internet side IP address of SIP proxy #2 is determined, SIP proxy 7 establishes a TCP connection to SIP proxy #2 and forwards the SIP INVITE request across Internet 6 to SIP proxy #2 (see FIG. 1). SIP proxy #2 is on domain BILOXI.COM. BILOXI.COM is the domain name of LAN 10. In the diagram of FIG. 3, arrow 24 extending from ATLANTA1.COM to BILOXI.COM represents this forwarding of the SIP INVITE request from SIP proxy 7 to SIP proxy 11.

SIP proxy 11 receives the SIP INVITE request. The SIP layer of the stack executing on SIP proxy 11 knows the IP addresses of all devices on LAN 10. From the indicated SIP callee address BOB@BILOXI.COM of the SIP INVITE request, the SIP layer of SIP proxy 11 obtains the IP address of BOB@BILOXI.COM and forwards the SIP INVITE request to the IP address (IP address #2) of IP phone 9 across a TCP connection. In FIG. 3, arrow 25 extending from BILOXI.COM to PARTY B represents this forwarding. The SIP layer of the stack of IP phone 9 receives the SIP INVITE request and, in accordance with the SIP protocol, returns a 200 OK SIP message. The 200 OK SIP message is forwarded back to PARTY A and IP phone 2 through SIP proxy 11 and SIP proxy 7 in the reverse process of the forwarding process described above. In FIG. 3, this forwarding is represented by arrows 26, 27 and 28.

Next, IP phone 2 receives the 200 OK SIP message and therefrom obtains the IP address of IP phone 9. IP phone 2 can then establish a TCP connection directly from IP phone 2 to IP phone 9. In response to receiving the 200 OK SIP message, IP phone 2 sends a SIP acknowledge (ACK) message back to IP phone 9 across the TCP connection. In FIG. 3, this is illustrated by arrow 29 that extends directly from PARTY A to PARTY B.

Figure 5:
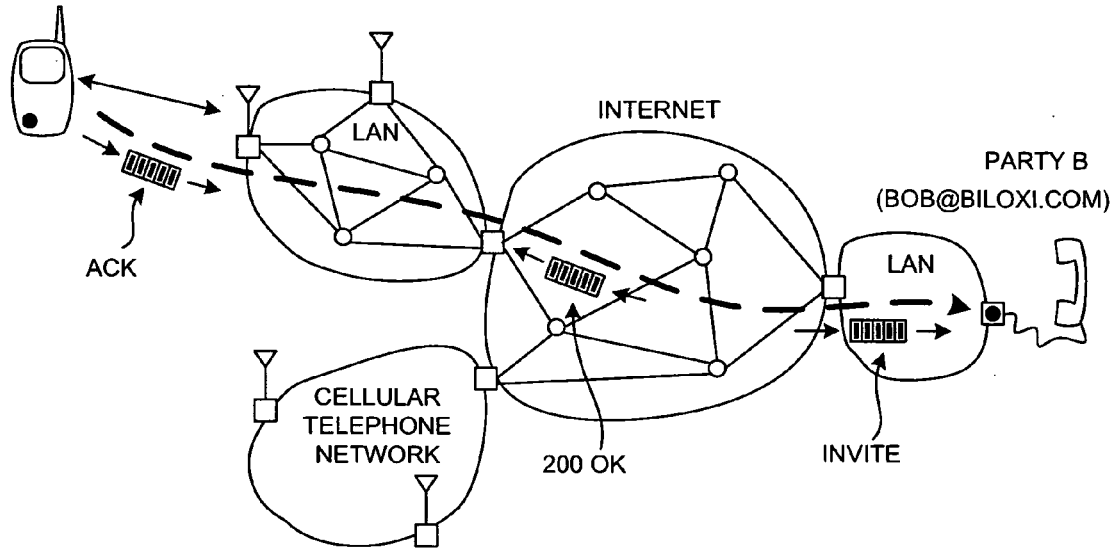
FIG. 5 illustrates the initialization of the first session.

FIG. 5 illustrates this SIP transaction involving the SIP INVITE request, the 200 OK message, and the ACK. Although all three SIP messages of the transaction are illustrated as propagating through the networks at the same time, the SIP messages are actually sent and received one at a time as described above. The result of the SIP transaction is the initialization of a first SIP session between IP address #1 (of PARTY A) and IP address #2 (of PARTY B). An initialized SIP session that has not been terminated is said to be "active", regardless of whether data payloads are being communicated in the session or not. In the present example, once the first SIP session has been initialized, first VoIP/VIP (voice over IP or video over IP) IP packets having voice and/or video data payloads are communicated between IP address #1 of IP phone 2 and IP address #2 of IP phone 9 in UDP (User Datagram Protocol) packets in accordance with the RTP (Real-Time Protocol) protocol. Data payloads for the first session are communicated using RTP over UDP over IP, whereas control packets for the first session are communicated using SIP over TCP over IP.

Figure 6:
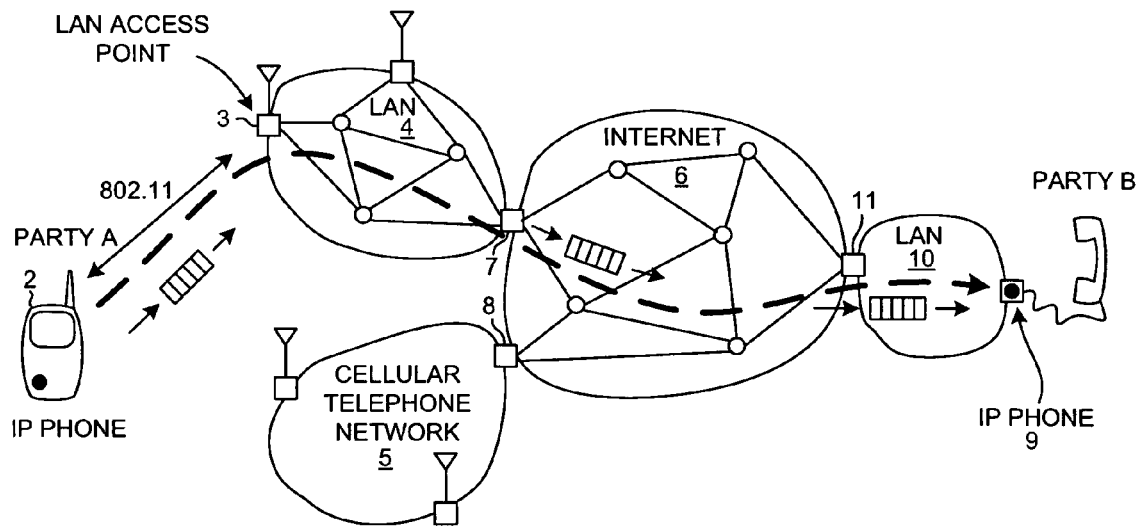
FIG. 6 illustrates the first session as PARTY A moves IP phone 2 away from the access point 3 of the system of FIG. 1.

FIG. 6 illustrates the communication of some of these first VoIP/VIP EP data payload packets between IP phone 2 and IP phone 9. This communication involves wireless communication in accordance with the 802.11 protocol between IP phone 2 and access point 3 of LAN 4. 802.11 is a relatively short range RF communication protocol. In the present example, PARTY A moves farther and farther away from access point 3. IP phone 2 detects the signal strength of RF transmissions received from access point 3. In the present example, an indication of the detected signal strength is available on the IP phone 2 as an RSSI (Radio Signal Strength Indicator) signal that is output from the receiver amplifier of the 802.11 transceiver in IP phone 2. The receiver amplifier of the 802.11 transceiver within access point 3 also detects the signal strength of RF transmissions received from IP phone 2 and this detected signal strength is reported from access point 3 back to IP phone 2. EP phone 2 is therefore cognizant of the strength of received transmissions in both directions. As PARTY A and IP phone 2 move away from access point 3, the detected signal strength of the 802.11 wireless link between IP phone 2 and access point 3 degrades until a threshold is reached. Once the threshold is reached, IP phone 2 determines that IP phone 2 should initialize a second SIP session using its long range cellular telephone transceiver. IP phone 2 initializes the second SIP session by sending a novel SIP message called a SPAWN message from PARTY A to PARTY B in the first session.

FIG. 7 is a diagram that illustrates the SPAWN SIP message.

FIG. 8 is a diagram that illustrates the communication of this SPAWN SIP message from PARTY A to PARTY B. In the same manner as the INVITE SIP message is communicated from PARTY A to PARTY B as described above, so too is the SPAWN SIP message communicated from IP phone 2, across the 802.11 wireless link to access point 3 on LAN 4, across LAN 4 to SIP proxy 7, across Internet 6 and to SIP proxy 11, and across LAN 11 and to PARTY B's IP phone 9. PARTY B's IP phone 9 receives the SPAWN SIP message and responds by sending a 200 OK SIP message back to PARTY A's IP phone 2. This 200 OK SIP message, however, includes a SPAWN ID (spawn identifier). IP phone 9 generates the SPAWN ID by generating a hash of the FROM field, the TO field, the CALL-ID field and the CSEQ number of the first session. The SPAWN-ID is stored in IP phone 9 for future reference to associate a second session with the first session. In the present example, the SPAWN ID is a sixteen-byte character string that follows a field name "SPAWN-ID:" in the 200 OK SIP message. The 200 OK SIP message that includes the SPAWN ID is forwarded back to IP phone 2 through SIP proxy 11 and SIP proxy 7.

Figure 9:
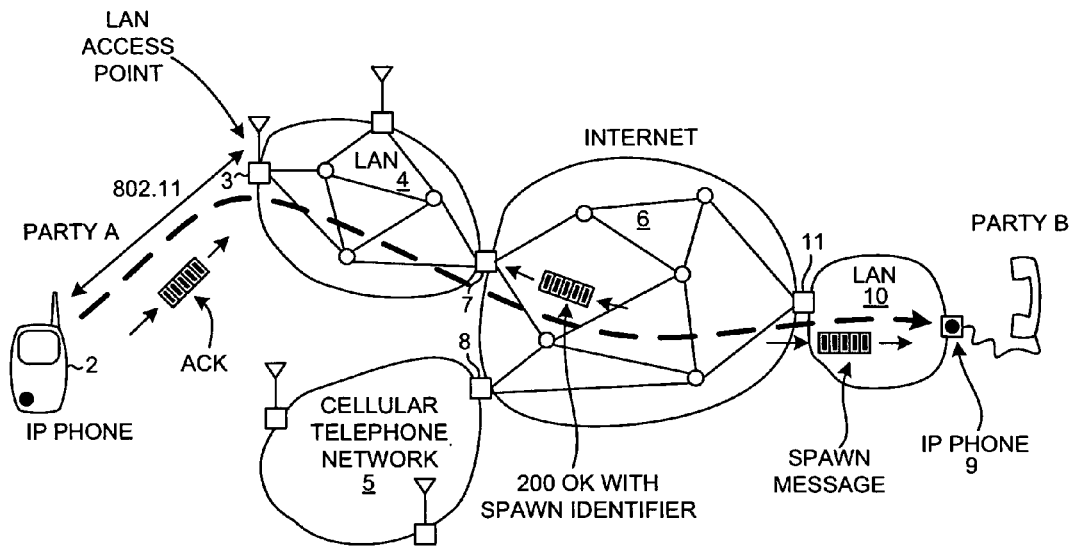
FIG. 9 illustrates the communication of the SPAWN SIP message through the system of FIG. 1.

FIG. 9 is a diagram that illustrates this SIP transaction involving the SPAWN SIP request, the 200 OK that includes the SPAWN ID, and the ACK. As illustrated, this transaction occurs in the first SIP session.

Figure 10:
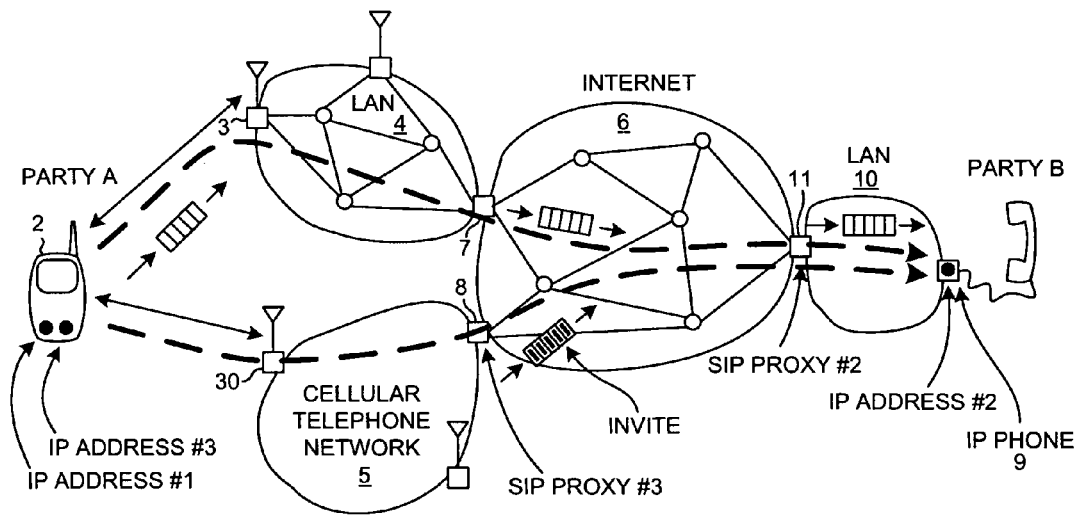
FIG. 10 illustrates the sending of a second SIP INVITE request from IP phone 2 to IP phone 9 to initialize a second session in accordance with the novel method.

FIG. 10 is a diagram that illustrates a next step wherein IP phone 2, upon receiving the 200 OK, issues a second INVITE SIP request. The black dots in IP phone 2 represent IP addresses. The second INVITE request includes the SPAWN ID and is communicated from PARTY A's IP phone 2 to PARTY B's IP phone 9. This second INVITE request is communicated across CDMA cellular telephone link from IP phone 2 to an access point (called a BTS or Base Transmitter Site) 30 on cellular telephone network 5 and then across cellular telephone network 5 to SIP proxy #3 (SIP proxy 8). This communication is across a TCP connection terminated at one end at an IP address #3 on IP phone 2 and at another end to the cellular telephone network side IP address of SIP Proxy 8. The second INVITE request is then forwarded on from SIP proxy 8 across Internet 6 to SIP proxy 11 across another TCP connection. The second INVITE request is then forwarded from SIP proxy 11 across LAN 10 to PARTY B's IP phone 9 across another TCP connection.

Whereas PARTY B's IP phone 9 would ordinarily reject an incoming INVITE request due to there already being an existing active session (the first session), in the presently described method SIP layer functionality within PARTY B's IP phone 9 recognizes the SPAWN ID of the incoming second INVITE request, sets up a second session including opening its own RTP streams, and associates the second session with the first session. IP phone 9 recognizes the SPAWN ID of the incoming second INVITE request by comparing the SPAWN-ID to its list of stored SPAWN-IDs.

Figure 10A:
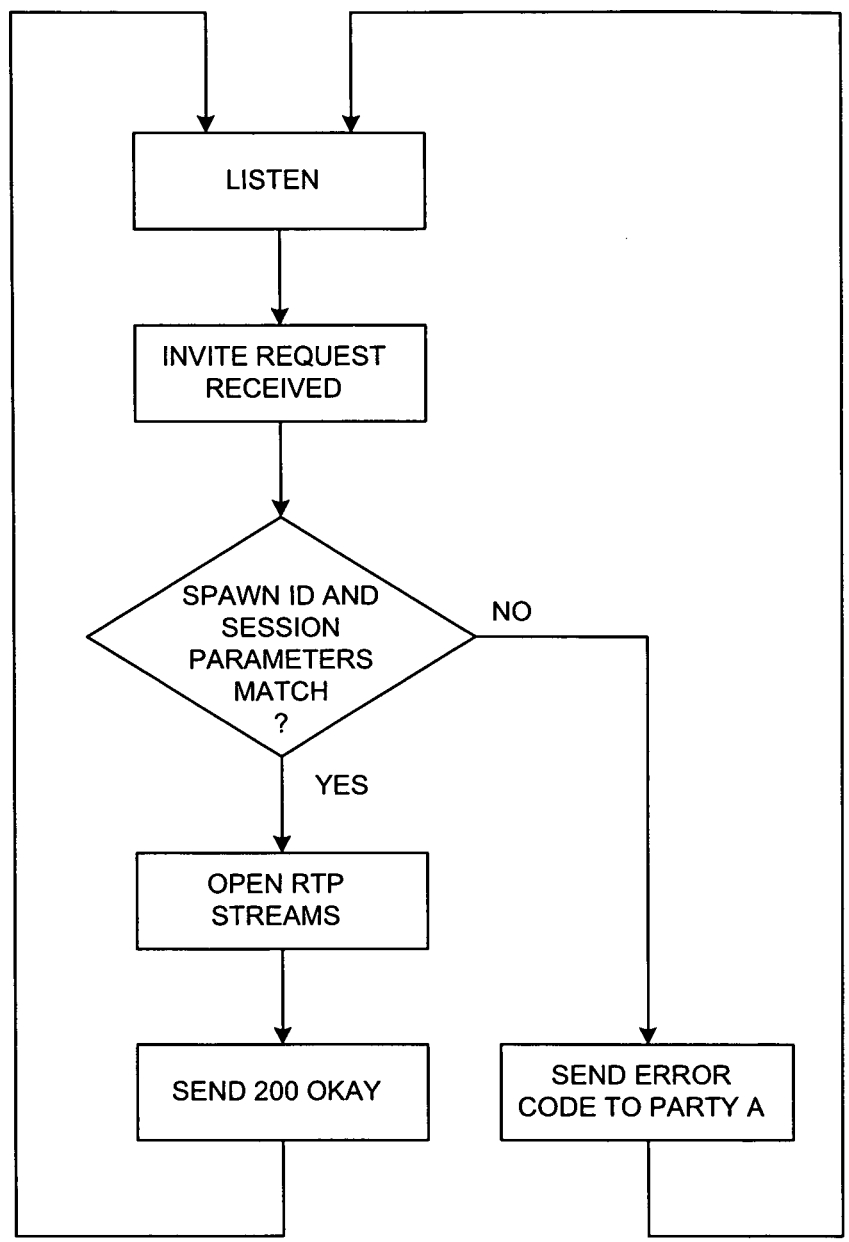
FIG. 10A is a simplified diagram of the structure of the software executing in IP phone 9.

FIG. 10A is a simplified diagram of the structure of the software executing in IP phone 9. IP phone 9 responds by returning a 200 OK SIP message back to PARTY A's IP phone 2. IP phone 2 completes the transaction by sending an ACK back to IP phone 9. The second INVITE request, the 200 OK, and the ACK are communicated from and to IP phone 2 through a CDMA wireless link and CDMA BTS 30.

Figure 11:
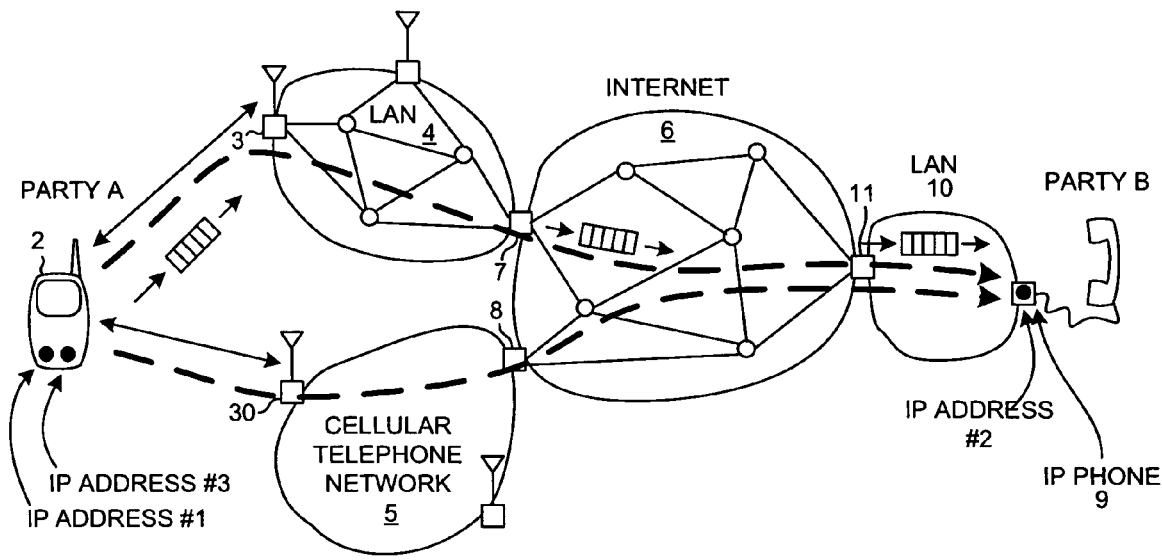
FIG. 11 illustrates both the first and second sessions being active.

FIG. 11 is a diagram that illustrates the active first session and the now initialized and active second session. Although the second session is active, data payload packets are not yet being communicated in the second session using RTP over UDP over IP. The first session (that involves 802.11 communication between IP phone 2 and access point 3) has a first CALL-ID whereas the second session now being initialized (that involves CDMA communication between IP phone 2 and cellular BTS 30) has a second CALL-ID.

Figure 12:
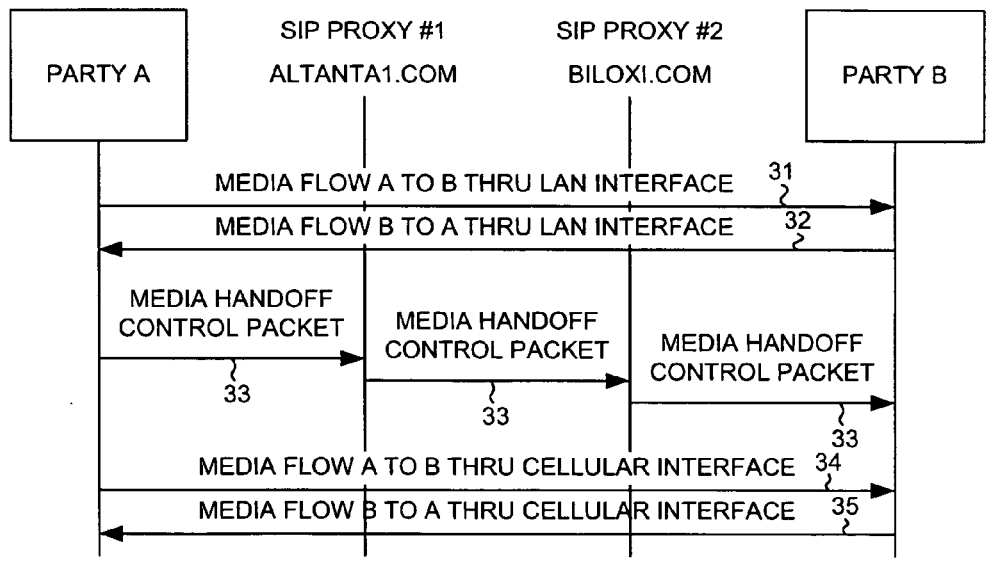
FIG. 12 is a diagram that illustrates the use of a media handoff control packet to signal to switching of VoIP data packets from the first session to the second session.

FIG. 12 illustrates a subsequent step wherein payload data media flow between IP phone 2 and IP phone 9 is switched (or "handed off") from the first session to the second session. Arrows 31 and 32 illustrate the initial flow of payload data media flow VoIP packets between PARTY A's IP phone 2 and PARTY B's IP phone 9. A data control handoff packet is then sent from PARTY A's IP phone 2 to PARTY B's IP phone 9 using RTP over UDP over IP. In the present example, this data control handoff packet is communicated in the first session through SIP proxies 7 and 11, but the data control handoff packet can also be communicated in the second session through SIP proxies 8 and 11. Arrows 33 illustrate the forwarding of the data control handoff packet. The data control handoff packet is a SIP message that, in one example, includes a SWITCH-FROM: field name and a SWITCH-TO: field name. The data control handoff packet is used to communicate to IP phone 9 that subsequent data payload packets will be sent in the second session. To cope with possible loss of the data control handoff packet, it is mandated that PARTY B not reject control packets which were originated by PARTY A's IP phone 2 using IP address #3.

FIG. 13 illustrates the media flow handoff control packet 34 following data payload packets that are being communicated in the first session from IP phone 2 to IP phone 9.

FIG. 14 is a diagram of the media flow handoff control packet 34. After sending the media flow handoff control packet, IP phone 2 switches from sending data payloads of the media stream in the first session to sending data payloads of the media stream in the second session. The media stream in the present example is a voice conversation. When IP phone 9 receives the media flow handoff control packet, IP phone 9 receives subsequent data payload packets on the second session and buffers the data payloads of those packets in a FIFO (first-in-first out) memory behind previously received data payloads of packets received on the first session. The data payloads are output from the FIFO and supplied to the user of IP phone 9 so that the data payloads are ordered according to RTP sequence number and timestamps. Data payloads of the media stream are therefore seamlessly switched from the first active session to the second active session without the call being perceptively broken. Neither the first session nor the second session involves any circuit-switched portions. Both the first session and the session involve VoIP packets and IP phone 9 retains knowledge of the two sessions. The two sessions do not constitute a three-way call. Moreover, SIP proxies 7, 8 and 11 are standard SIP proxies that do not involve any special functionality to support the novel SPAWN method. In FIG. 12, arrows 34 and 35 illustrate the flow of subsequent VoIP data payload packets in the second session.

Figure 15:
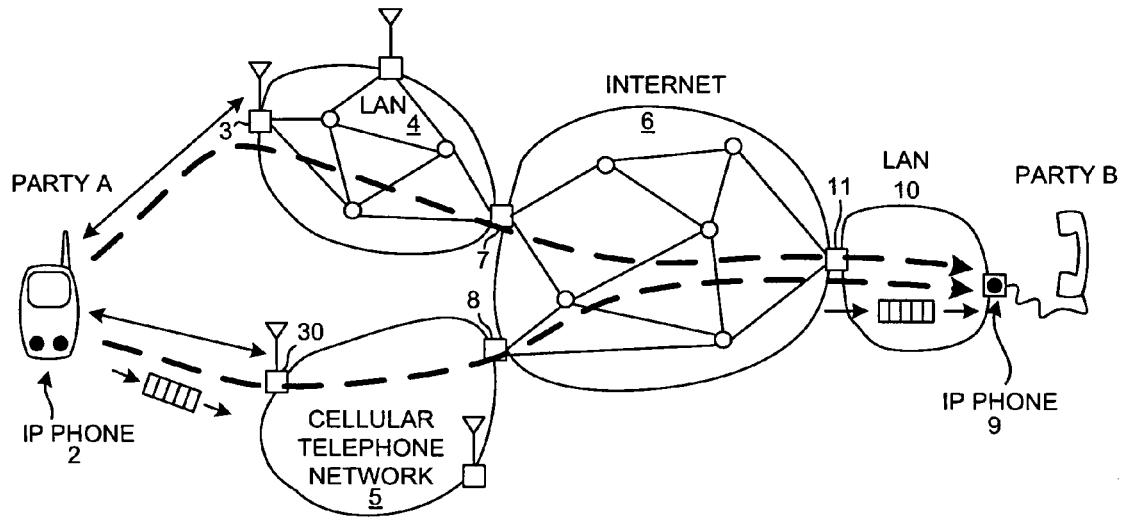
FIG. 15 illustrates the flow of data payloads over the second session.

FIG. 15 illustrates the flow of data payload VoIP packets in the second session after the data control handoff packet was communicated in the first session. IP phone 2 can switch the flow data payload VoIP packets back and forth between the first session and the second session as required or desired.

Figure 16:
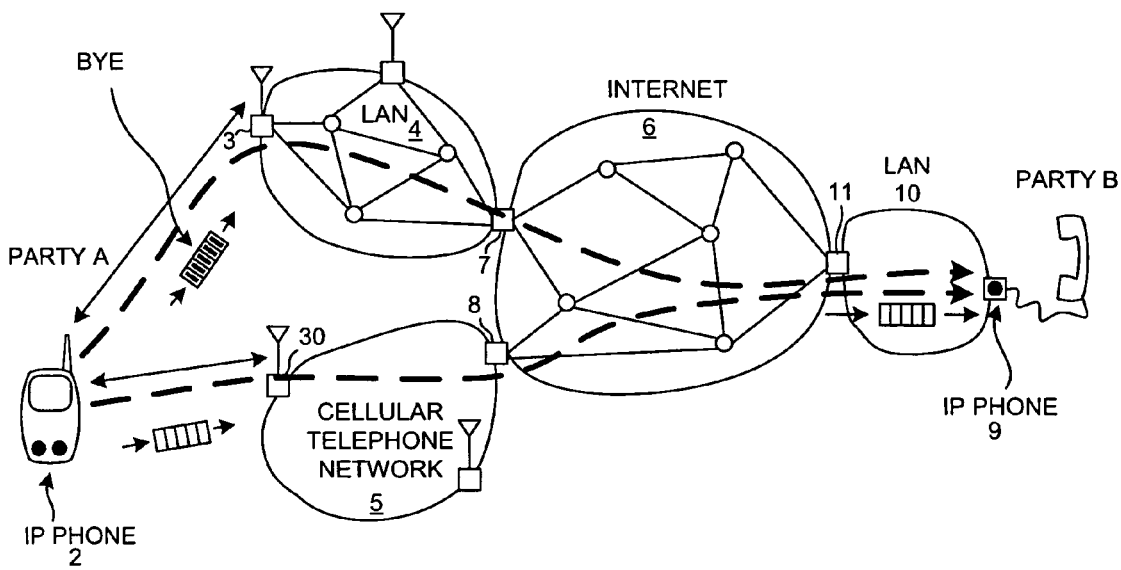
FIG. 16 illustrates the sending of a BYE SIP message from IP phone 2 to IP phone 9 to terminate the first session.

FIG. 16 illustrates a subsequent step wherein IP phone 2 terminates the first session by sending a SIP BYE message to IP phone 9. Where the signal strength of the 802.11 wireless link is decreasing, this BYE message is sent while there is still communication between IP phone 2 and access point 3. After the BYE message is sent and received, the first session is terminated and the second session is used to sustain communication of data payload packets for the media stream.

Figure 17:
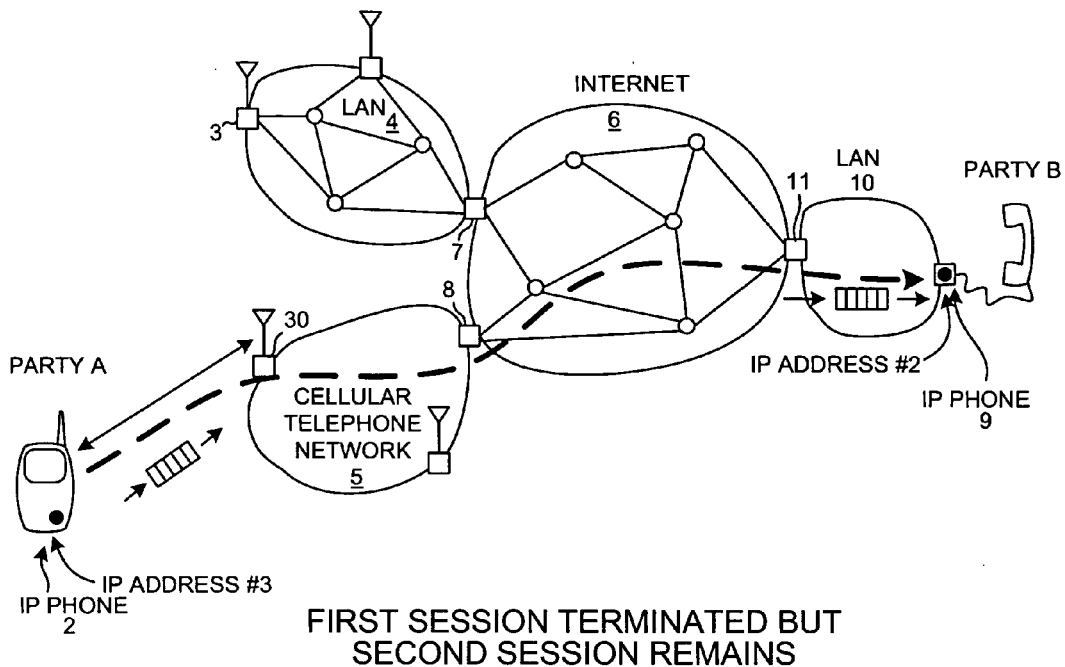
FIG. 17 illustrates the system of FIG. 1 after the first session has been terminated. Data payload VoIP packets for the media stream are no longer being communicated in the first session but rather are now being communicated in the second session.

FIG. 17 illustrates the flow of data payload VoIP packets in the second session after the first session has been terminated.

Although the example described above involves switching from a first session that has an 802.11 link to a second session that has a CDMA link, this need not be the case. In another example, the first session involves a CDMA wireless link and the second session involves an 802.11 wireless link. Such a situation might present itself when PARTY A is initially using CDMA communication through cellular BTS 30 and then arrives into the local coverage area of access point 3. Although both CDMA and 802.11 service are available within the local coverage area of access point 3, the method described above is used to setup a second session that involves the 802.11 wireless link. The flow of data payload VoIP packets is then switched from the CDMA first session to the 802.11 second session. To avoid charges associated with use of the CDMA link, the first session having the CDMA link is terminated using the BYE message once the second session is active and handling data payloads of the VoIP media stream.

Figure 18:
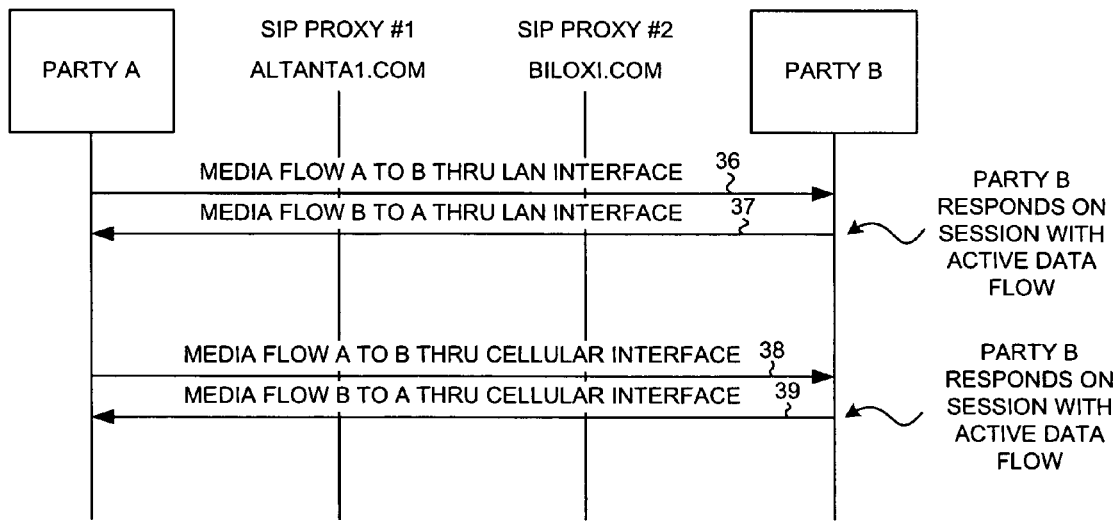
FIG. 18 illustrates an alternative way for IP phone 9 to determine that VoIP data payload packets for the media stream are no longer being communicated in the first session but rather are now to be communicated in the second session.

FIG. 18 illustrates an alternative data flow handoff mechanism. Rather than sending a control handoff control packet to signal the switching of data payload VoIP packets from one session to another session, IP phone 2 simply starts communicating data payload VoIP packets in the second session. Arrow 36 represents initial data payload VoIP packet communicated from PARTY A to PARTY B. When PARTY B receives data payload VoIP packets on the first session, PARTY B responds by sending any data payload VoIP packets it wishes to send to PARTY A in the first session. This flow of data payload VoIP packets from PARTY B to PART A is represented by arrow 37. To switch the flow of data payload VoIP packets from the first session to the second session, PARTY A simply starts sending data payload VoIP packets to PARTY B in the second session. This flow is represented by arrow 38. When PARTY B starts receiving data payload VoIP packets on the second session, PARTY B responds by sending any subsequent data payload VoIP packets it wishes to send to PARTY A in the second session. This flow of data payload VoIP packets from PARTY B to PART A on the second session is represented by arrow 39.

Although a system is described above wherein PARTY B has an IP phone to which VoIP data payload packets are sent across a TCP connection that terminates in the IP phone, PARTY B may not have an IP phone but rather may engage in IP telephony via a media gateway. If the call is an incoming call to PARTY B, then the media gateway receives the VoIP call, makes a second conventional call to PARTY B, and relays payload information between the VoIP call and the second conventional call. If the call is an outgoing call from PARTY B, then PARTY B makes a conventional call to the media gateway, the media gateway makes a second VoIP call to the intended callee, and the media gateway relays payload information between the conventional call and the VoIP call. The media gateway therefore acts as a dummy IP phone for PARTY B.

Although IP phone 9 in the example described above is a landline IP phone, IP phone 9 is a mobile wireless communication device (for example, a cellular telephone) in another example. The first and second sessions can be initiated by either mobile or landline IP phones.

Although certain specific embodiments are described above for instructional purposes, the present invention is not limited thereto. Accordingly, various modifications, adaptations, and combinations of the various features of the described specific embodiments can be practiced without departing from the scope of the invention as set forth in the claims.

What is claimed is:

1. A method for wireless communication, comprising:
communicating first VoIP/VIP (voice over Internet Protocol or video over Internet Protocol) packets in a first session between a first IP address and a second IP address, wherein the first IP address is an IP address associated with a first device and wherein the second IP address is an IP address associated with a second device, and wherein communications associated with the first session occur over a first wireless communication link between the first device and a transceiver on a first network;
communicating a SPAWN SIP (Session Initialization Protocol) message in the first session from the first device to the second device, wherein the SPAWN SIP message identifies the first session;
initializing a second session using the SPAWN SIP message so that the first session and the second session are both active, the second session being between a third IP address and the second IP address, wherein the third IP address is associated with the first device, and wherein initializing the second session includes:
receiving, at the first device and from the second device, a first SIP OK message including a SPAWN identifier, wherein the SPAWN identifier is generated at the second device in response to receiving the SPAWN SIP message, and wherein the SPAWN identifier associates the first session and the second session with each other;
sending a first SIP ACK message from the first device to the second device in response to receiving the first SIP OK message;
sending a SIP INVITE message from the first device to the second device, wherein the SIP INVITE message includes the SPAWN identifier;
receiving by the first device a second SIP OK message generated by the second device when the SPAWN identifier included in the SIP INVITE message is recognized by the second device by comparison with a list of one or more SPAWN identifiers stored on the second device; and
sending a second SIP ACK message from the first device to the second device; and
communicating second VoIP/VIP packets in the second session between the third IP address and the second IP address, wherein communications associated with the second session occur over a second wireless communication link between the first device and a transceiver on a second network, wherein the first VoIP/VIP packets and the second VoIP/VIP packets include voice data of a single media stream.

2. The method of claim 1, wherein the first VoIP/VIP packets are communicated over the first wireless communication link in accordance with a wireless LAN (local area network) communication protocol, wherein the second VoIP/VIP packets are communicated over the second wireless communication link in accordance with a cellular telephone communication protocol, and wherein the first device is a device taken from the group consisting of: an IP phone, a cellular telephone, a PDA (Personal Digital Assistant), a computer having a wireless communication capability.

3. The method of claim 1, wherein the first VoIP/VIP packets are first RTP (Real-Time Transport Protocol) payload packets, wherein the second VoIP/VIP packets are second RTP payload packets, wherein some of the second RTP payload packets are communicated in the second session and thereafter some of the first RTP payload packets are communicated in the first session.

4. The method of claim 1, wherein the first VoIP/VIP packets are first RTP (Real-Time Transport Protocol) payload packets, wherein the second VoIP/VIP packets are second RTP payload packets, and wherein no RTP payload packet is communicated in the first session once any RTP payload packet has been communicated in the second session.

5. The method of claim 1, wherein the first device is an IP phone, and wherein the second device is taken from the group consisting of: an IP phone, and a media gateway.

6. The method of claim 1, further comprising:
communicating a second SIP message from the first device to the second device, the second SIP message indicating that the first device will communicate subsequent VoIP/VIP packets using the second session and not the first session.

7. The method of claim 1, further comprising:
communicating a second SIP message from the first device to the second device, the second SIP message indicating that the first device will communicate subsequent VoIP/VIP packets using the first session and not the second session.

8. A set of processor-executable instructions stored on a non-transitory processor-readable medium, wherein the processor-readable medium is part of a SIP endpoint entity, when executed by a processor, the set of instructions being for:
handling first VoIP/VIP (voice over Internet Protocol or video over Internet Protocol) data payloads transferred to a mobile communication device in a first session, the first session being performed at least in part over a first wireless communication link between a call endpoint and the SIP endpoint entity;
receiving a SPAWN message from the call endpoint in the first session, the SPAWN message being transferred at least in part over the first wireless communication link;
generating a SPAWN identifier associated with the first session, storing the SPAWN identifier in the memory of the SIP endpoint entity, and sending the SPAWN identifier from the SIP endpoint entity back to the call endpoint at least in part over the first wireless communication link;
receiving a SIP invite message from the call endpoint, the SIP invite message including the SPAWN identifier associated with the first session, the SIP invite message being transferred by the call endpoint at least in part over a second wireless communication link;
setting up a second session at least in part over the second wireless communication link between the call endpoint and the SIP endpoint entity such that both the first session and the second session are both active when the SPAWN identifier included in the SIP invite message is recognized by comparison with a list of one or more stored SPAWN identifiers associated with the first session; and
handling second VoIP/VIP data payloads transferred at least in part over the second wireless communication link to the mobile communication device in the second session, wherein the first VoIP/VIP data payloads and the second VoIP/VIP data payloads are data payloads of a single media stream.

9. The set of processor-executable instructions of claim 8, wherein the call endpoint is a cellular telephone, and wherein the SIP endpoint entity is a media gateway.

10. The set of processor-executable instructions of claim 8, wherein the SPAWN message includes a first portion and a second portion, the first portion identifying the first session and including a first SIP address associated with the first session, the first SIP address having a form XXX@YYYY, wherein XXX identifies the call endpoint, and wherein YYYY is a domain name of a first network, the second portion including a second SIP address associated with the second session, the second SIP address having a form XXX@ZZZZ, wherein XXX is identical to the XXX in the first SIP address, and wherein ZZZZ is a domain name of a second network.

11. The set of processor-executable instructions of claim 8, wherein the first session has a first CALL-ID, and wherein the second session has a second CALL-ID.

12. The set of processor-executable instructions of claim 11, wherein the SPAWN message includes the first CALL-ID and the second CALL-ID.

13. The set of processor-executable instructions of claim 8, wherein the call endpoint has a first air interface and a second air interface, wherein communication associated with the first session includes communicating using the first air interface, and wherein communication associated with the second session includes communicating using the second air interface.

14. The set of processor-executable instructions of claim 8, wherein the SIP endpoint entity is taken from the group consisting of:
the mobile communication device, an IP phone, a cellular telephone, a cellular IP phone, a personal digital assistant (PDA) having a wireless communication capability, a computer having a wireless communication capability, and a media gateway.

15. The set of processor-executable instructions of claim 8, wherein the handling of the second voice data payloads involves ordering the first and second VoIP/VIP data payloads.

16. The set of processor-executable instructions of claim 15, wherein the first and second VoIP/VIP data payloads are used to generate sound.

17. A set of processor-executable instructions stored on a non-transitory processor-readable medium, wherein the processor-readable medium is part of a mobile communication device, when executed by a processor, the set of instructions being for:
communicating, at least in part over a first wireless communication link, first VoIP/VIP (voice over Internet Protocol or video over Internet Protocol) data payloads to a call endpoint in a first session;
generating a SPAWN message and sending, at least in part over the first wireless communication link, the SPAWN message from the mobile communication device to the call endpoint in the first session;
receiving, at least in part over the first wireless communication link, from the call endpoint, a SIP response message to the mobile communication device in the first session, the SIP response message including a SPAWN identifier generated by the call endpoint and associated with the first session;
generating a SIP invite message that includes the SPAWN identifier associated with the first session, and sending the SIP invite message from the mobile communication device to the call endpoint, at least in part over a second wireless communication link, such that a second session is set up, at least in part over the second wireless communication link, the first and second sessions being both active, the first and second sessions having different CALL-IDs; and
communicating second VoIP/VIP data payloads, at least in part over the second wireless communication link, to the call endpoint in the second session, wherein the first VoIP/VIP data payloads and the second VoIP/VIP data payloads are payloads of a single media stream.

18. The set of processor-executable instructions of claim 17, wherein the SPAWN message includes a first portion and a second portion, the first portion identifying the first session and including a first SIP address associated with the first session, the first SIP address having a form XXX@YYYY, wherein XXX identifies the mobile communication device, and wherein YYYY is a domain name of a first network, the second portion including a second SIP address associated with the second session, the second SIP address having a form XXX@ZZZZ, wherein XXX is identical to the XXX in the first SIP address, and wherein ZZZZ is a domain name of a second network.

19. The set of processor-executable instructions of claim 17, wherein the mobile communication device has a first air interface and a second air interface, wherein communication associated with the first session includes communicating using the first air interface, and wherein communication associated with the second session includes communicating using the second air interface.

20. An apparatus for wireless communication, comprising:
means for communicating first VoIP/VIP (voice over Internet Protocol or video over Internet Protocol) packets in a first session between a first IP address and a second IP address, wherein the first IP address is an IP address associated with a first device and wherein the second IP address is an IP address associated with a second device, and wherein communications associated with the first session occur over a first wireless communication link between the first device and a transceiver on a first network;
means for communicating a SPAWN SIP (Session Initialization Protocol) message in the first session from the first device to the second device, wherein the SPAWN SIP message identifies the first session;
means for initializing a second session using the SPAWN SIP message so that the first session and the second session are both active, the second session being between a third IP address and the second IP address, wherein the third IP address is associated with the first device, and wherein means for initializing the second session includes:
means for receiving, at the first device and from the second device, a first SIP OK message including a SPAWN identifier, wherein the SPAWN identifier is generated at the second device in response to receiving the SPAWN SIP message, and wherein the SPAWN identifier associates the first session and the second session with each other;
means for sending a first SIP ACK message from the first device to the second device in response to receiving the first SIP OK message;
means for sending a SIP INVITE message from the first device to the second device, wherein the SIP INVITE message includes the SPAWN identifier;
means for receiving by the first device a second SIP OK message generated by the second device when the SPAWN identifier included in the SIP INVITE message is recognized by the second device by comparison with a list of one or more SPAWN identifiers stored on the second device;
means for sending a second SIP ACK message from the first device to the second device; and means for communicating second VoIP/VIP packets in the second session between the third IP address and the second IP address, wherein communications associated with the second session occur over a second wireless communication link between the first device and a transceiver on a second network, wherein the first VoIP/VIP packets and the second VoIP/VIP packets include voice data of a single media stream.

21. A set of processor-executable instructions stored on a non-transitory processor-readable medium, wherein the processor-readable medium is part of a mobile wireless communication device, when executed by a processor, the set of instructions being for:

communicating first VoIP/VIP (voice over Internet Protocol or video over Internet Protocol) packets in a first session between a first IP address and a second IP address, wherein the first IP address is an IP address associated with a first device and wherein the second IP address is an IP address associated with a second device, and wherein communications associated with the first session occur over a first wireless communication link between the first device and a transceiver on a first network;

communicating a SPAWN SIP (Session Initialization Protocol) message in the first session from the first device to the second device, wherein the SPAWN SIP message identifies the first session;

initializing a second session using the SPAWN SIP message so that the first session and the second session are both active, the second session being between a third IP address and the second IP address, wherein the third IP address is associated with the first device, and wherein initializing the second session includes:

receiving, at the first device and from the second device, a first SIP OK message including a SPAWN identifier, wherein the SPAWN identifier is generated at the second device in response to receiving the SPAWN SIP message, and wherein the SPAWN identifier associates the first session and the second session with each other;

sending a first SIP ACK message from the first device to the second device in response to receiving the first SIP OK message;

sending a SIP INVITE message from the first device to the second device, wherein the SIP INVITE message includes the SPAWN identifier;

receiving by the first device a second SIP OK message generated by the second device when the SPAWN identifier included in the SIP INVITE message is recognized by the second device by comparison with a list of one or more SPAWN identifiers stored on the second device;

sending a second SIP ACK message from the first device to the second device; and communicating second VoIP/VIP packets in the second session between the third IP address and the second IP address, wherein communications associated with the second session occur over a second wireless communication link between the first device and a transceiver on a second network, wherein the first VoIP/VIP packets and the second VoIP/VIP packets include voice data of a single media stream.

22. A method for wireless communication, comprising handling first VoIP/VIP (voice over Internet Protocol or video over Internet Protocol) data payloads transferred to a mobile communication device in a first session, the first session being performed at least in part over a first wireless communication link between a call endpoint and the SIP endpoint entity;

receiving a SPAWN message from the call endpoint in the first session, the SPAWN message being transferred at least in part over the first wireless communication link;

generating a SPAWN identifier associated with the first session, storing the SPAWN identifier in the memory of the SIP endpoint entity, and sending the SPAWN identifier from the SIP endpoint entity back to the call endpoint at least in part over the first wireless communication link;

receiving a SIP invite message from the call endpoint, the SIP invite message including the SPAWN identifier associated with the first session, the SIP invite message being transferred by the call endpoint at least in part over a second wireless communication link;

setting up a second session at least in part over the second wireless communication link between the call endpoint and the SIP endpoint entity such that both the first session and the second session are both active when the SPAWN identifier included in the SIP invite message is recognized by comparison with a list of one or more stored SPAWN identifiers associated with the first session; and handling second VoIP/VIP data payloads transferred at least in part over the second wireless communication link to the mobile communication device in the second session, wherein the first VoIP/VIP data payloads and the second VoIP/VIP data payloads are data payloads of a single media stream.

23. A method for wireless communication, comprising:

communicating at least in part over a first wireless communication link first VoIP/VIP (voice over Internet Protocol or video over Internet Protocol) data payloads to a call endpoint in a first session;

generating a SPAWN message and sending, at least in part over the first wireless communication link, the SPAWN message from a mobile communication device to the call endpoint in the first session;

receiving, at least in part over the first wireless communication link, from the call endpoint, a SIP response message to the mobile communication device in the first session, the SIP response message including a SPAWN identifier generated by the call endpoint and associated with the first session;

generating a SIP invite message that includes the SPAWN identifier associated with the first session, and sending the SIP invite message from the mobile communication device to the call endpoint, at least in part over a second wireless communication link, such that a second session is set up, at least in part over the second wireless communication link, the first and second sessions being both active, the first and second sessions having different CALL-IDs; and communicating second VoIP/VIP data payloads, at least in part over the second wireless communication link, to the call endpoint in the second session, wherein the first VoIP/VIP data payloads and the second VoIP/VIP data payloads are payloads of a single media stream.

24. An apparatus for wireless communication, comprising means for handling first VoIP/VIP (voice over Internet Protocol or video over Internet Protocol) data payloads transferred to a mobile communication device in a first session, the first session being performed at least in part over a first wireless communication link between a call endpoint and a SIP endpoint entity;

means for receiving a SPAWN message from the call endpoint in the first session, the SPAWN message being transferred at least in part over the first wireless communication link;

means for generating a SPAWN identifier associated with the first session, storing the SPAWN identifier in the memory of SIP endpoint entity, and sending the SPAWN identifier from the SIP endpoint entity back to the call endpoint at least in part over the first wireless communication link;

means for receiving a SIP invite message from the call endpoint, the SIP invite message including the SPAWN identifier associated with the first session, the SIP invite message being transferred by the call endpoint at least in part over a second wireless communication link;

means for setting up a second session at least in part over the second wireless communication link between the call endpoint and the SIP endpoint entity such that both the first session and the second session are both active, when the SPAWN identifier included in the SIP invite message is recognized by comparison with a list of one or more stored SPAWN identifiers associated with the first session; and means for handling second VoIP/VIP data payloads transferred at least in part over the second wireless communication link to the mobile communication device in the second session, wherein the first VoIP/VIP data payloads and the second VoIP/VIP data payloads are data payloads of a single media stream.

25. An apparatus for wireless communication, comprising:

means for communicating at least in part over a first wireless communication link first VoIP/VIP (voice over Internet Protocol or video over Internet Protocol) data payloads to a call endpoint in a first session;

means for generating a SPAWN message and sending, at least in part over the first wireless communication link, the SPAWN message from a mobile wireless device to the call endpoint in the first session;

means for receiving, at least in part over the first wireless communication link, from the call endpoint, a SIP response message to the mobile communication device in the first session, the SIP response message including a SPAWN identifier generated by the call endpoint and associated with the first session;

means for generating a SIP invite that includes the SPAWN identifier associated with the first session, and sending the SIP invite message from the mobile communication device to the call endpoint, at least in part over the second wireless communication link, such that a second session is set up, at least in part over the second wireless communication link, the first and second sessions being both active, the first and second sessions having different CALL-IDs; and means for communicating second VoIP/VIP data payloads, at least in part over the second wireless communication link, to the call endpoint in the second session, wherein the first VoIP/VIP data payloads and the second VoIP/VIP data payloads are payloads of a single media stream.

* * * * *